(12) United States Patent
Li et al.

(10) Patent No.: US 11,573,474 B2
(45) Date of Patent: Feb. 7, 2023

(54) DISPLAY MODULE AND DISPLAY DEVICE

(71) Applicants: Chongqing BOE Smart Electronics System Co., Ltd., Chongqing (CN); BOE TECHNOLOGY GROUP CO., LTD., Beijing (CN)

(72) Inventors: Tianlong Li, Beijing (CN); Zili Ou, Beijing (CN); Xuangang Li, Beijing (CN); Qiangeng Cheng, Beijing (CN); Ganggui Shi, Beijing (CN); Chuanbo Zou, Beijing (CN)

(73) Assignees: Chongqing BOE Smart Electronics System Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 321 days.

(21) Appl. No.: 16/957,699

(22) PCT Filed: Dec. 16, 2019

(86) PCT No.: PCT/CN2019/125624
§ 371 (c)(1),
(2) Date: Jun. 24, 2020

(87) PCT Pub. No.: WO2020/155892
PCT Pub. Date: Aug. 6, 2020

(65) Prior Publication Data
US 2021/0173279 A1 Jun. 10, 2021

(30) Foreign Application Priority Data
Jan. 30, 2019 (CN) .......................... 201920164468.2

(51) Int. Cl.
*G02F 1/16755* (2019.01)
*G02F 1/1679* (2019.01)
*G02F 1/167* (2019.01)

(52) U.S. Cl.
CPC ........ *G02F 1/16755* (2019.01); *G02F 1/1679* (2019.01); *G02F 1/167* (2013.01); *G02F 2201/503* (2013.01)

(58) Field of Classification Search
CPC ..... G02F 1/167; G02F 1/1679; G02F 1/16755
See application file for complete search history.

(56) References Cited

U.S. PATENT DOCUMENTS

| 11,264,297 B2 * | 3/2022 | Li .......................... G02F 1/1679 |
| 2006/0291034 A1 | 12/2006 | Patry et al. |

(Continued)

FOREIGN PATENT DOCUMENTS

| CN | 1936663 A | 3/2007 |
| CN | 101202254 A | 6/2008 |

(Continued)

OTHER PUBLICATIONS

ISA China National Intellectual Property Administration, International Search Report Issued in Application No. PCT/CN2019/125624, dated Mar. 23, 2020, WIPO, 19 pages. (Submitted with Partial Translation).

*Primary Examiner* — Dung T Nguyen
(74) *Attorney, Agent, or Firm* — McCoy Russell LLP (57) ABSTRACT

The present disclosure provides a display module and a display device. The display module includes: a substrate in which the substrate includes a first surface and a second surface that are arranged to face each other, and a plurality of side surfaces simultaneously connected to the first surface and the second surface; a display layer arranged on the first surface of the substrate; and a protection structure arranged at a connection position between two adjacent sides of the plurality of side surfaces of the substrate.

20 Claims, 4 Drawing Sheets

(56) References Cited

U.S. PATENT DOCUMENTS

| | | |
|---|---|---|
| 2007/0065091 A1 | 3/2007 | Hinata et al. |
| 2008/0197455 A1 | 8/2008 | Fukuda |
| 2009/0147205 A1 | 6/2009 | Mizuno et al. |
| 2016/0118416 A1 | 4/2016 | Yamazaki et al. |

FOREIGN PATENT DOCUMENTS

| | | |
|---|---|---|
| CN | 202512330 U | 10/2012 |
| CN | 107111970 A | 8/2017 |
| CN | 107167981 A | 9/2017 |
| CN | 108279542 A | 7/2018 |
| CN | 209167760 U | 7/2019 |
| JP | H01237522 A | 9/1989 |
| JP | 2003222841 A | 8/2003 |

\* cited by examiner

DISPLAY MODULE AND DISPLAY DEVICE

CROSS-REFERENCE TO RELATED APPLICATIONS

The present application is a U.S. national phase application of International Application No. PCT/CN2019/125624 filed on Dec. 16, 2019, which claims a priority to Chinese Patent Application No, 201920164468.2 filed on Jan. 30, 2019. The entire contents of each of the above-listed applications are hereby incorporated by reference for all purposes.

TECHNICAL FIELD

The present disclosure relates to the field of display technology, in particular, to a display module and a display device.

BACKGROUND AND SUMMARY

Electrophoretic display mainly includes a thin film transistor substrate (TFT), an electronic ink film (EINK Film) and a protective film. The electronic ink film is located between the thin film transistor substrate and the protective film. In order to achieve the sealing of the electronic ink film, for example, a sealant is usually used to seal between the protective film and the thin film transistor substrate. However, the thin film transistor substrate located at the lower layer is usually made of a glass material, so it is prone to cause the problem of poor cracking due to vibration and falling at the four corners, resulting in damage to the circuit.

SUMMARY

In one aspect, an embodiment of the present disclosure provides a display module, including: a substrate, in which the substrate includes a first surface and a second surface that are arranged to face each other, and a plurality of side surfaces simultaneously connected to the first surface and the second surface; a display layer which is arranged on the first surface of the substrate; and a protection structure which is arranged at a connection position between two adjacent side surfaces among the plurality of side surfaces of the substrate.

Optionally, the protection structure includes a connection surface, and the connection surface connects the two adjacent side surfaces at the connection position.

Optionally, the substrate is made of a glass material.

Optionally, the connection surface is located on the substrate.

Optionally, the protection structure includes a first covering body, the connection surface is located on the first covering body, and the first covering body covers the connection position.

Optionally, the connection surface is formed as a flat surface or an arc surface.

Optionally, the protection structure includes a second covering body extending from a position on the first surface of the substrate to the connection position between the two adjacent side surfaces of the substrate.

Optionally, the second covering body covers the connection position between two adjacent side surfaces.

Optionally, the display module further includes a protective layer which is arranged on the display layer, in which the protective layer includes a main body portion covering the display layer and an extension portion connected to the main body portion and extending toward the connection position; and in which an orthogonal projection of the main body portion on the first surface is located within the first surface, and the extension portion is formed as the second covering body.

Optionally, an orthogonal projection of the display layer on the first surface is located within the first surface, and the protection structure is located in a region other than the orthogonal projection of the display layer on the first surface.

Optionally, the display layer includes an electronic ink film layer, and a thin film transistor array is arranged on the substrate.

Optionally, the protection structure is arranged at the connection position between every two adjacent side surfaces of the substrate.

In another aspect, an embodiment of the present disclosure also provides a display device, including the display module as described in any one of the above items.

DETAILED DESCRIPTION

In order to illustrate the technical solutions, purposes, and advantages in the embodiments of the present disclosure in a clearer manner, the technical solutions in the embodiments of the present disclosure will be described hereinafter in conjunction with the drawings in the embodiments of the present disclosure in a clear and complete manner. Obviously, the following embodiments relate to a part of, rather than all of, the embodiments of the present disclosure. Based on the described embodiments of the present disclosure, a person skilled in the art may obtain the other embodiments, which also fall within the scope of the present disclosure.

Figure 1:
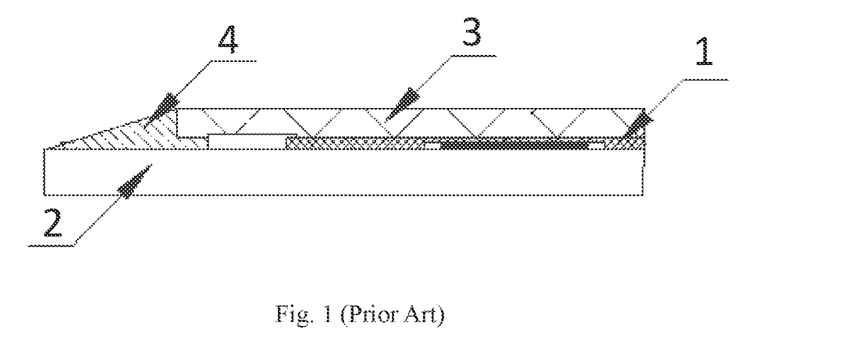
FIG. 1 is a schematic view showing the structure of the display device for electrophoretic display in the related art.

Electrophoretic display mainly includes a thin film transistor substrate (TFT), an electronic ink film (FINK Film) and a protective film. In the electrophoretic display device shown in FIG. 1, the electronic ink film 1 is located on the thin film transistor substrate 2, and the electronic ink film 1 is covered with a protective film 3 to protect the electronic ink film 1. In the related art, in order to achieve the sealing of the electronic ink film 1, a sealant 4 is usually used to seal between the protective film 3 and the thin film transistor substrate 2. In order to facilitate the application of the sealant 4 between the thin film transistor substrate 2 and the protective film 3 to ensure the sealing of the electronic ink film 1, the size of the protective film 3 is generally smaller than the size of the thin film transistor substrate 2. However, in this arrangement mode, the thin film transistor substrate 2 located at the lower layer is usually made of a glass material, so it is prone to cause the problem of poor cracking due to vibration and falling at the four corners, resulting in damage to the circuit.

In order to solve the above technical problem, the present disclosure provides a display module and a display device including the display module, which can solve the problem that when a substrate made of a hard and brittle material, it is prone to cracking at four corners due to vibration and falling, resulting in damage to the circuit.

In one aspect, an embodiment of the present disclosure provides a display module, including: a substrate, in which the substrate includes a first surface and a second surface that are arranged to face each other, and a plurality of side surfaces simultaneously connected to the first surface and the second surface; a display layer Which is arranged on the first surface of the substrate; and a protection structure which is arranged at a connection position between two adjacent side surfaces among the plurality of side surfaces of the substrate.

In the display module according to the embodiment of the present disclosure, a protective structure is arranged at the connection position between two adjacent side surfaces of the substrate located at the lower layer of the display module, to prevent the connection position (i.e., the position of four corners) of the adjacent two side surfaces from being prone to crack due to vibration and falling and the resulted damage to the circuit.

In an optional embodiment of the present disclosure, the substrate may be made of a glass material, or other materials that are brittle and easily broken by collision.

In the display module according to the embodiment of the present disclosure, the display layer is arranged on the first surface of the substrate, and when the first surface is placed upward, the substrate is located below the display layer. Optionally, the substrate is a substrate located below the display layer and made entirely of hard and brittle materials. Further optionally, the substrate may include a substrate having one layer of material, or may include a substrate having at least two layers of material. For example, when the lower portion of the display layer includes a substrate made of a plurality of layers of hard and brittle materials, the "substrate" mentioned in the embodiments of the present disclosure may be an assembly made of the plurality of layers of hard and brittle materials.

In an embodiment of the present disclosure, the display layer is all display units in the display module for realizing the display function. For example, when the display module in the embodiment of the present disclosure is a display module of an electrophoretic display, the substrate of the present disclosure is a substrate for arranging a thin film transistor array, and the display layer includes an electronic ink film layer. Of course, the display module according to an embodiment of the present disclosure is not limited to a display module that can only be an electrophoretic display.

In the display module of the electrophoretic display, the edge of the thin film transistor substrate made of hard and brittle materials protrudes from the electronic ink film layer and the protective film, so the positions of the four corners of the thin film transistor substrate are easily broken due to vibration and falling. The specific structure of the display module according to the embodiment of the present disclosure will be described in detail below by taking the display module of the electrophoretic display as an example.

In an optional embodiment of the present disclosure, at the connection position between two adjacent side surfaces of the substrate, the protection structure includes a connection surface, and the connection surface connects the two adjacent side surfaces at the connection location. Damage due to easy breakage of sharp corners is avoided by replacing a sharp corner structure formed at the connection between two adjacent side surfaces in the related art with a connecting surface connecting two adjacent side surfaces of the substrate.

Figure 2:
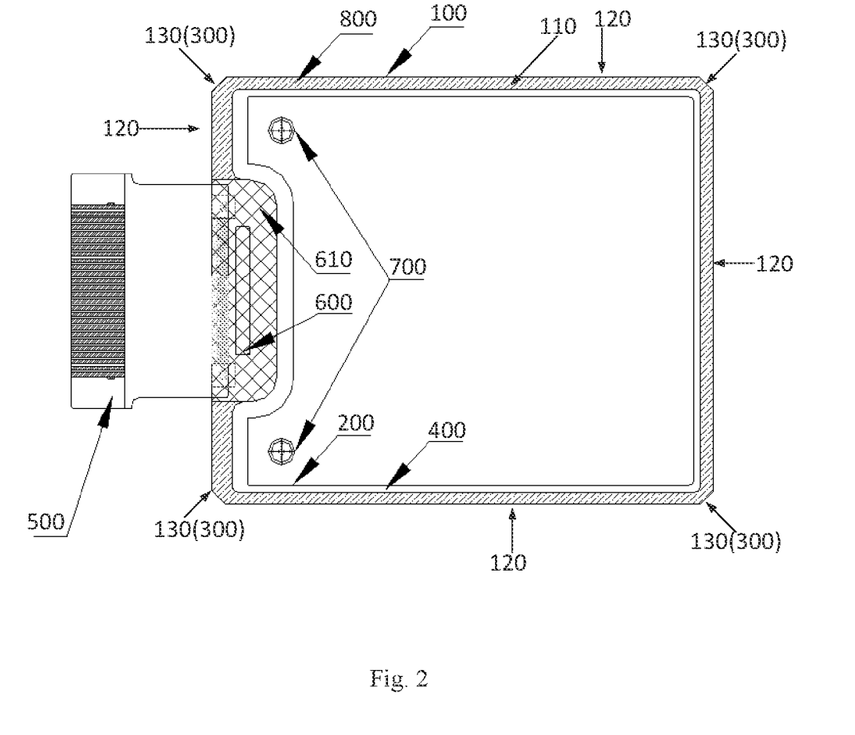
FIG. 2 is a schematic view showing the structure of the display module according to the first embodiment of the present disclosure.

FIG. 2 is a schematic view showing the structure of the display module according to an embodiment of the present disclosure. In this embodiment, the display module includes: a substrate 100 and a display layer 200 arranged on the first surface 110 of the substrate 100; a protection structure 300 arranged at the connection position between two adjacent side surfaces 120 of the substrate 100; in which the two side surfaces 120 are connected to the first surface 110, respectively.

In this embodiment, the protection structure 300 includes a connection surface 130, which replaces the sharp corner structure formed at the connection between the two side surfaces in the prior art, to avoid the problem that the sharp corner is likely to cause cracks, resulting in damage to the circuit.

Figure 3:
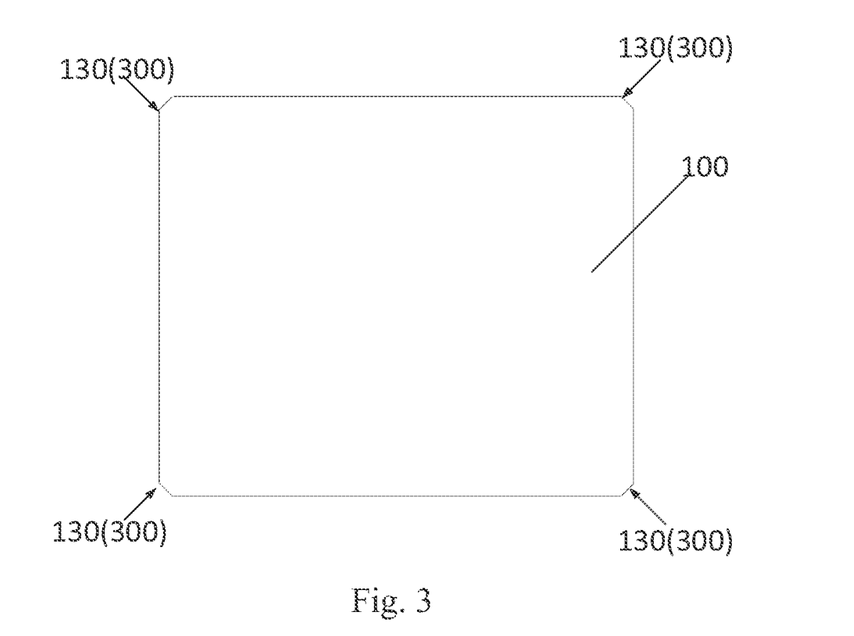
FIG. 3 is a schematic view showing the planar structure of the substrate according to the first embodiment of the present disclosure.

In an optional embodiment of the present disclosure, FIG. 3 is a schematic view showing the planar structure of the substrate 100. The connection surface 130 is located at the connection position between the two adjacent side surfaces 120 of the substrate 100. That is, the connection position between the two adjacent side surfaces 120 of the substrate 100 is directly made as the connection surface, to form the protection structure 300. This can avoid the formation of sharp corners at the connection position between the two adjacent side surfaces 120.

In an optional embodiment of the present disclosure, the connecting surface 130 is a flat surface or an arc surface.

Figure 4:
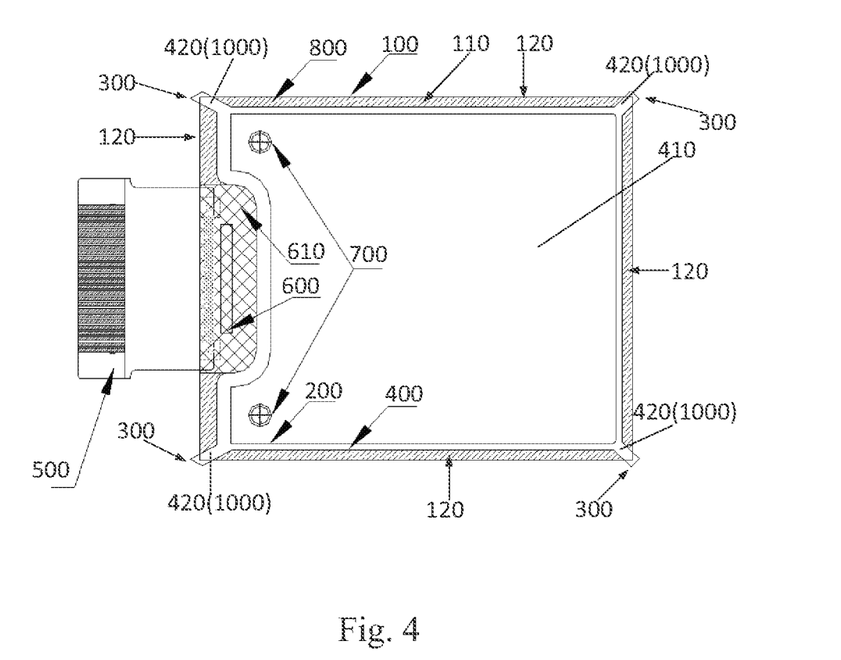
FIG. 4 is a schematic view showing the structure of the display module according to the second embodiment of the present disclosure.

In addition to setting the connection position between the two adjacent side surfaces 120 of the substrate 100 as the lion surface, the display module according to the embodiment of the present disclosure can also be provided with a covering body at the connection position between the two adjacent side surfaces 120 of the substrate 100, as specifically shown in FIG. 4. By means of the covering body, the two adjacent side surfaces 120 of the substrate 100 are connected by the covering body.

Figure 7:
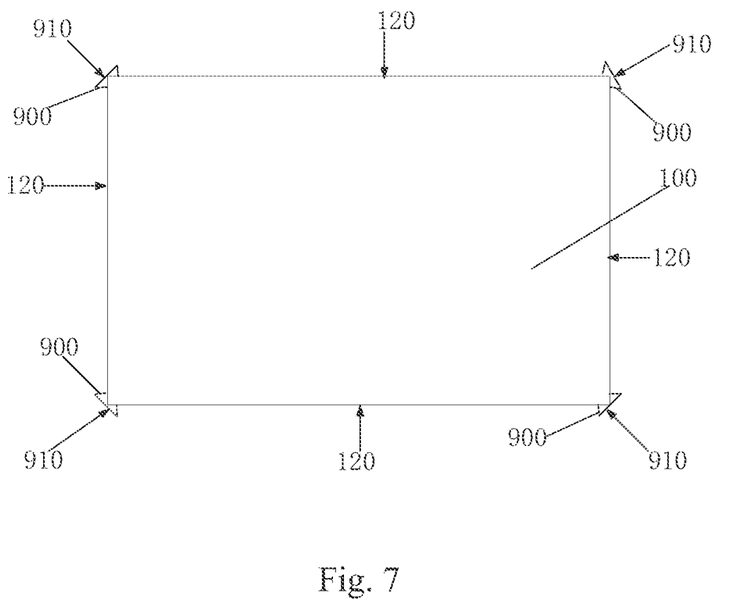
FIG. 7 is a schematic view showing the structure of the connection relationship between the substrate and the protection structure in the display module according to an embodiment of the present disclosure.

Based on the above embodiment, as shown in FIG. 7, the protection structure may include a first covering body 900 covering the connection position between the adjacent two side surfaces 120 of the substrate 100, and the connecting surface 910 is located on the first covering body 900. That is, by means of providing the first covering body 900 for covering the sharp corners at the connection position between the two adjacent side surfaces 120 of the substrate 100, and forming a connecting surface 910 formed as a flat surface or an arc surface on the first covering body 900, the connection surface 910 is located between two adjacent side surfaces of the substrate. This arrangement replaces the sharp corner structure formed at the connection between two adjacent side surfaces in the related art, to avoid the problem that the sharp corner is likely to cause cracks, resulting in damage to the circuit.

In an optional embodiment of the present disclosure, although the drawings do not show other specific structures in which the connection surface is formed by the first covering body and covers the sharp corners between two adjacent side surfaces of the substrate, according to the above description, a person skilled in the art would understand the specific manner of providing the first covering body with the above structure on the substrate, which will not be described in detail here.

In the display module according to an optional embodiment of the present disclosure, as shown in FIGS. 2 and 3, a protection structure 300 is provided at the connection position between every two adjacent side surfaces 120 of the substrate 100, to effectively protect the corner positions of the substrate 100. That is, a connecting surface 130 is provided at the connection position between every two adjacent side surfaces 120.

In another optional embodiment of the present disclosure, the protection structure includes a second covering body extending from a position on the first surface of the substrate to the connection position between the two adjacent side surfaces of the substrate.

In the above embodiment, the connection position between the two adjacent side surfaces of the substrate are covered by the second covering body to protect the connection positions, so as to reduce the risk of cracking and damage due to vibration and falling.

In an optional embodiment of the present disclosure, the second covering body is made of a flexible material. Optionally, the second covering body completely covers the connection position between two adjacent side surfaces of the substrate above the first surface. That is, the extending scope may go beyond the connection position between the two adjacent side surfaces.

Optionally, the second covering body may also partially cover the first surface and extend from a position on the first surface, and cover the connection position between two adjacent side surfaces to protect the connection position.

Specifically, as shown in FIG. 4, the display module includes: a substrate 100 and a display layer 200 arranged on the first surface 110 of the substrate 100, in which a protection structure 300 is provided at a connection position between two adjacent side surfaces 120 of the substrate 100, and the two side surfaces 120 are connected to the first surface 110, respectively.

In this embodiment, the protective structure 300 optionally includes a second covering body 1000 extending from a position on the first surface 110 to the connection position between the adjacent two side surfaces 120 of the substrate 100.

Figure 5:
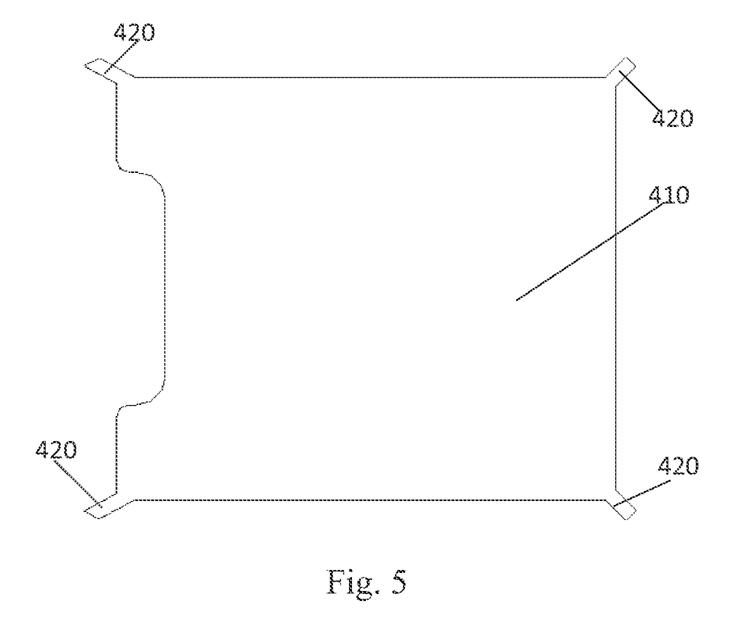
FIG. 5 is a schematic view showing the planar structure of the protective layer according to the second embodiment of the present disclosure.

Specifically, as shown in FIGS. 4 and 5, the display module further includes a protective layer 400 arranged on the display layer 200, which is used to isolate the display layer 200 from outside air, so as to achieve the effect of protecting the display layer 200. Optionally, the protective layer 400 includes a main body portion 410 covering the display layer 200 and an extension portion 420 connected to the main body portion 410 and extending toward the connection position. Optionally, an orthogonal projection of the main body portion 410 on the first surface 110 is located within the first surface 110, and the extension portion 420 is formed as the above-mentioned second covering body 1000.

In an embodiment of the present disclosure, an orthogonal projection of the display layer 200 on the first surface 110 is located within the first surface 110. Optionally, an orthogonal projection of the main body portion 410 on the first surface 110 covers an orthogonal projection of the display layer 200 on the first surface 110, so that the main body portion 410 of the protective layer 400 can protect the display layer 200.

In an optional embodiment of the present disclosure, the protective layer 400 is respectively provided with extension portions 420 at the positions of four corners of the main body portion 410. Optionally, each of the extension portions 420 respectively extends toward one of the connection position between the two adjacent side surfaces 120 of the substrate 100, to entirely cover the connection position between the two adjacent side surfaces 120 of the substrate 100 or to cover the connection position between the two adjacent side surfaces 120.

Figure 6:
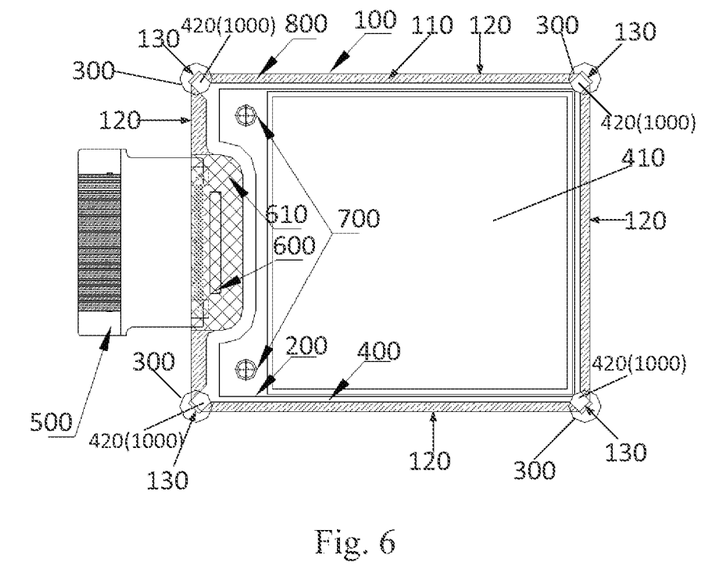
FIG. 6 is a schematic view showing the structure of the display module according to the third embodiment of the present disclosure.

According to a still another embodiment of the present disclosure, as shown in FIG. 6, the display module includes: a substrate 100 and a display layer 200 arranged on a first surface 110 of the substrate 100; in which a protection structure 300 is provided at a connection position between two adjacent side surfaces 120 of the substrate 100, and the two side surfaces 120 are connected to the first surface 110, respectively.

In this embodiment, the protective structure 300 includes not only the connection surface 130 at the connection position between the adjacent two side surfaces 120 of the substrate 100, but also the second covering body 1000 extending from a position on the first surface 110 to the connection position between the adjacent two side surfaces 120 of the substrate 100.

Specifically, the protective layer 400 located above the display layer 200 is provided with extension portions 420 at the positions of four corners of the main body portion 410 respectively, and the above-mentioned second covering body 1000 is formed by the extension portions 420.

Optionally, the connecting surface 130 may be a flat surface or an arc surface. Optionally, the extension portion 420 may entirely cover the connection position between the two adjacent side surfaces 120 of the substrate 100 on the first surface 110, or may cover the connection position between the two adjacent side surfaces 120.

By using the above-mentioned arrangement manner, the connection position between the two adjacent side surfaces 120 of the substrate 100 are set as the connection surfaces, and at the same time, by providing an extension portion 420 extending toward the connection position on the protective layer 400, the connection position of two adjacent side surfaces of the substrate 100 can be effectively protected, to avoid the problem of cracking due to vibration and falling and the resulting damage to the circuit.

In an embodiment of the present disclosure, as shown in FIGS. 2 to 6, the protection structure 300 is located in a region other than the orthogonal projection of the display layer 200 on the first surface 110. That is, the arrangement of the protection structure 300 on a region other than the display layer 200 will not affect the normal display of the display layer 200.

In an optional embodiment of the present disclosure, the display module may be a display module for electrophoretic display. For example, as shown in FIGS. 2, 4 and 6, the substrate 100 is a substrate for providing a thin film transistor array, and the display layer 200 includes an electronic ink film layer.

In addition, as shown in FIGS. 2, 4 and 6, when the display module is a display module of an electrophoretic display, it includes the above-mentioned protective layer 400 and also includes: a flexible printed circuit (FPC) board 500 and a control chip 600. The FPC 500 is optionally provided independently of the substrate 100 and is connected to the substrate 100 through connection terminals. The control chip 600 is optionally provided on the substrate 100 and is located in a region other than the region provided with the display layer 200 on the first surface 110 of the substrate 100.

Optionally, the periphery of the control chip 600 is coated with room temperature vulcanized silicone rubber (RTV) 610 for protecting the control chip 600. Optionally, a plurality of silver glue connection points 700 are distributed between the substrate 100 and the display layer 200 for conducting the thin film transistor array on the substrate 100 and the electronic ink film layer on the display layer 200, so as to be able to control the electronic ink film layer by the thin film transistor array, thereby realizing the display function.

Optionally, a sealant 800 is applied on the peripheral edges of the display layer 200, to seal the space between the substrate 100 and the display layer 200 and to prevent moisture from entering the display layer 200.

In the display module according to the embodiment of the present disclosure, a protective structure is arranged at the connection position between two adjacent side surfaces of the substrate located at the lower layer of the display module, to prevent the connection position (i.e., the position of four corners) of the adjacent two side surfaces from being prone to crack due to vibration and falling.

It should be noted that the display modules described in the embodiments of the present disclosure are not limited to the display module that can only be applied to electrophoretic displays, and the display modules provided with a protection structure in the above embodiments may also be other types of display modules, which will not be repeated here.

In another aspect, the present disclosure also provides a display device including the above-mentioned display module. Based on the above detailed description, a person skilled in the art should be able to understand the specific structure of the display device including the display module, which will not be repeated here.

The above descriptions are optional embodiments of the present disclosure. It should be noted that one skilled in the art would make several improvements and substitutions without departing from the principles of the present disclosure. These improvements and modifications should also be regarded as the protection scope of the present disclosure.

The invention claimed is:

1. A display module, comprising:
   a substrate, wherein the substrate comprises a first surface and a second surface that are arranged to face each other, and a plurality of side surfaces simultaneously connected to the first surface and the second surface;
   a display layer which is arranged on the first surface of the substrate; and
   a protection structure which is arranged at a connection position between two adjacent side surfaces among the plurality of side surfaces of the substrate,
   wherein the protection structure comprises a second covering body extending from a position on the first surface of the substrate to the connection position between the two adjacent side surfaces of the substrate.

2. The display module of claim 1, wherein the protection structure comprises a connection surface, and the connection surface connects the two adjacent side surfaces at the connection position.

3. The display module of claim 2, wherein the connection surface is located on the substrate.

4. The display module of claim 2, wherein the protection structure comprises a first covering body, the connection surface is located on the first covering body, and the first covering body covers the connection position.

5. The display module of claim 2, wherein the connection surface is formed as a flat surface or an arc surface.

6. The display module of claim 1, wherein the substrate is made of a glass material.

7. The display module of claim 1, wherein the second covering body covers the connection position between two adjacent side surfaces.

8. The display module of claim 1, wherein the display module further comprises:
   a protective layer which is arranged on the display layer, wherein the protective layer comprises a main body portion covering the display layer and an extension portion connected to the main body portion and extending toward the connection position, and
   wherein an orthogonal projection of the main body portion on the first surface is located within the first surface, and the extension portion is formed as the second covering body.

9. The display module of claim 1, wherein an orthogonal projection of the display layer on the first surface is located within the first surface, and the protection structure is located in a region other than the orthogonal projection of the display layer on the first surface.

10. The display module of claim 1, wherein the display layer comprises an electronic ink film layer, and a thin film transistor array is arranged on the substrate.

11. The display module of claim 1, wherein the protection structure is arranged at the connection position between every two adjacent side surfaces of the substrate.

12. A display device, comprising the display module of claim 1.

13. The display device of claim 12, wherein the protection structure comprises a connection surface, and the connection surface connects the two adjacent side surfaces at the connection position.

14. The display device of claim 13, wherein the connection surface is located on the substrate.

15. The display device of claim 13, wherein the protection structure comprises a first covering body, the connection surface is located on the first covering body, and the first covering body covers the connection position.

16. The display device of claim 13, wherein the connection surface is formed as a flat surface or an arc surface.

17. The display device of claim 12, wherein the substrate is made of a glass material.

18. The display device of claim 13, wherein the second covering body covers the connection position between two adjacent side surfaces.

19. The display device of claim 12, wherein the display module further comprises:
   a protective layer which is arranged on the display layer, wherein the protective layer comprises a main body portion covering the display layer and an extension portion connected to the main body portion and extending toward the connection position, and
   wherein an orthogonal projection of the main body portion on the first surface is located within the first surface, and the extension portion is formed as the second covering body.

20. The display module of claim 1, wherein an orthogonal projection of the display layer on the first surface is located within the first surface, and the protection structure is located in a region other than the orthogonal projection of the display layer on the first surface.

* * * * *